United States Patent [19]

Blevins et al.

[11] Patent Number: 4,951,413
[45] Date of Patent: * Aug. 28, 1990

[54] TROLLING LINE DEPRESSOR

[76] Inventors: Bruce D. Blevins, 2101 Weaver Pike, Lot 31, Bristol, Tenn. 37620; Steven Stone, P.O. Box 569, Abingdon, Va. 24210

[*] Notice: The portion of the term of this patent subsequent to Oct. 15, 2002 has been disclaimed.

[21] Appl. No.: 356,242

[22] Filed: May 24, 1989

[51] Int. Cl.⁵ .............................................. A01K 85/00
[52] U.S. Cl. .................................................. 43/43.13
[58] Field of Search ................... 43/43.13, 42.49, 43.12

[56] References Cited

U.S. PATENT DOCUMENTS

| | | |
|---|---|---|
| 1,749,464 | 3/1930 | Bond . |
| 2,062,718 | 12/1936 | Kallberg . |
| 2,520,562 | 8/1950 | Peeler ................. 43/43.13 |
| 2,645,053 | 7/1953 | Moritz . |
| 3,135,065 | 6/1964 | Cromoga . |
| 3,466,787 | 9/1969 | Collins . |
| 3,643,370 | 2/1972 | Cook et al. . |
| 3,667,148 | 6/1972 | Dawson . |
| 3,708,904 | 1/1973 | Zaharis . |
| 3,755,955 | 9/1973 | Saia . |
| 3,808,727 | 5/1974 | Flanders . |
| 3,863,382 | 2/1975 | Heili ................. 43/43.13 |
| 3,898,759 | 8/1975 | Jensen . |
| 3,940,872 | 3/1976 | Weber . |
| 3,956,847 | 5/1976 | Bayes . |
| 4,128,959 | 12/1978 | Staaden . |
| 4,199,891 | 4/1980 | Davis . |
| 4,237,644 | 12/1980 | Hansen . |
| 4,255,890 | 3/1981 | Smith . |
| 4,411,090 | 10/1983 | Seals . |
| 4,532,731 | 8/1985 | Wheeler ................. 43/43.13 |
| 4,546,565 | 10/1985 | Blevins . |
| 4,691,466 | 9/1987 | Lamb ................. 43/43.13 |

Primary Examiner—Kurt Rowan
Attorney, Agent, or Firm—Hoffman, Wasson, Fallow & Gitler

[57] ABSTRACT

A troll line depressor includes a pair of triangular wings with a dihedral angle of about 100 degrees therebetween. A rigid bridle connected between the upper and lower ends of the depressor provides a sliding connection for a ring at the end of a towing line, so that the depressor normally develops hydrodynanmic forces to depress the end of the towing line, but can tilt backward to an inoperative position when a fish strikes, or forward to an inoperative position if the depressor engages river bottom debris.

6 Claims, 2 Drawing Sheets

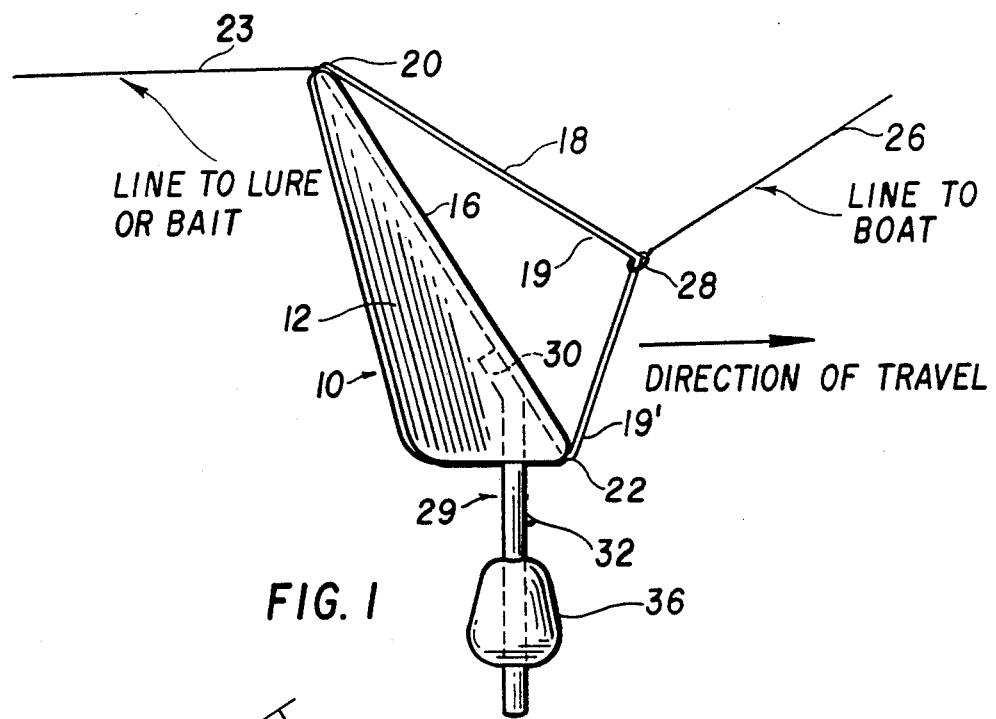
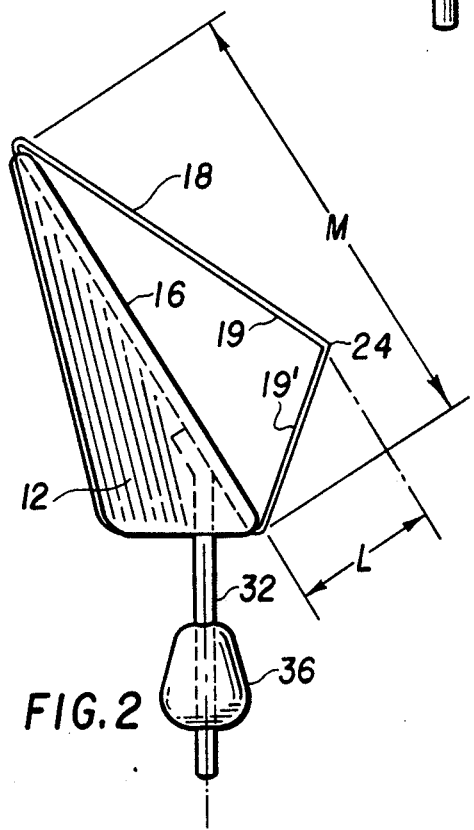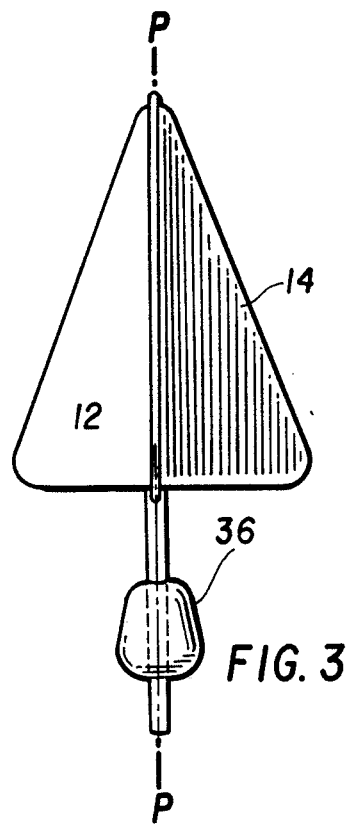

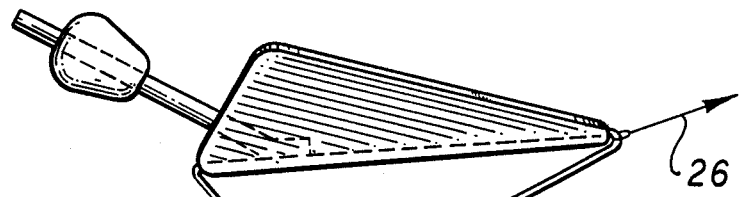
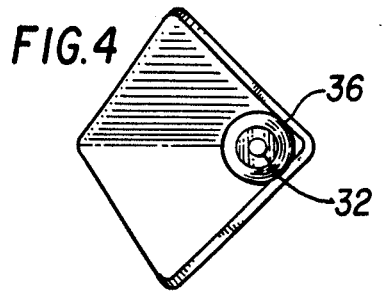
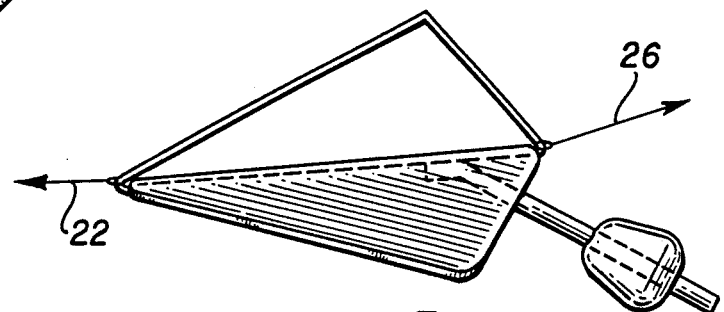
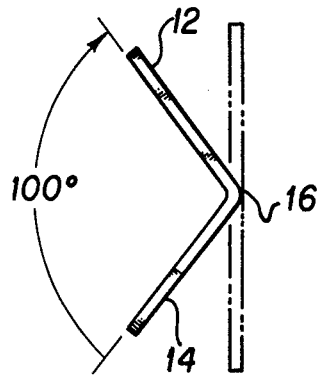
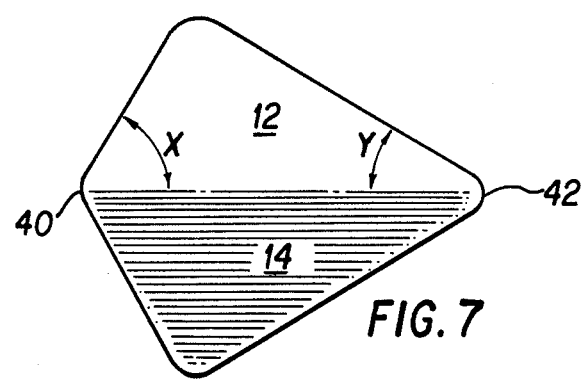
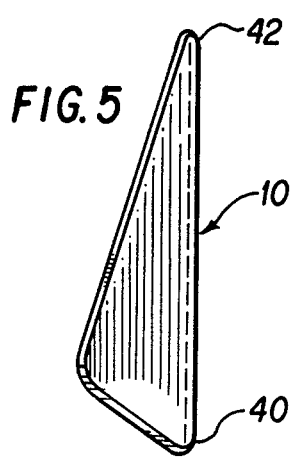

TROLLING LINE DEPRESSOR

BACKGROUND

In troll fishing, it is desirable to maintain one's lure or bait at a constant depth, and to be able to repeat this depth once it is determined how deep the fish are located. It is also desirable that the fishing line descend from the boath at a steep angle, to minimize line drag and the changes of entangling the line with obstacles, other lines, and the like. While at trolling depth, the trolling device should be stable; that is, it should not veer from side to side or vary in depth. Furthermore, it should not flutter or otherwise produce distracting noise or movement.

Prior U.S. patents disclose devices in the nature of hydrodynamic plates designed to be towed through water by a boat. These devices are generally intended to maintain a bait or lure line at trolling depth; to do so, they may be constrained to have a certain angle of attack to the water. U.S. Pat. No. 2,645,053 discloses an exemplary prior art device, which trails behind the boat at an angle of about 15 degrees to horizontal.

To our knowledge, none of the many prior art proposals has achieved marked commercial success. The reason for this is a matter for conjecture; perhaps the prior devices lacked adequate stability or depth predictability, or perhaps they could not obtain sufficiently steep depression angles.

Blevins' Patent, No. 4,546,565, discloses a trolling device which improved over the prior art in terms of stability and depression angle. The device now disclosed is a further improvement, in that it allows the device to tilt to an inactive, horizontal position either when a fish strikes a line attached to the device, or when an obstacle on the river bottom is encountered.

SUMMARY OF THE INVENTION

As with Blevins' prior invention, it is an object of this invention to maintain a trolling line at a desired depth, which depth can be deduced from the trolling line length.

A second object is to obtain a large line depression angle.

Another object is to provide a simple trolling device having inherent hydrodynamic stability. A related object is to make trolling line depth independent of boat speed.

An additional object is to enable the trolling device to flip to a non-operative position when either a fish strikes the line, or an obstacle is encountered on the river bottom.

In accordance with the foregoing, a troll line depressor embodying the invention comprises a plate defining two triangular wings interconnected along a spine, the wings being symmetrical about a plane containing the spine and swept backward with a dihedral angle therebetween, so as to provide lateral stability when the depressor is towed through water. A weight is affixed to the plate, with its center of gravity below the lowermost portion of the plate, and a bridle is affixed to the spine and extends forward therefrom. The bridle has an apex at a perpendicular distance from the spine approximately one-third the length of the spine.

BRIEF DESCRIPTION OF THE DRAWINGS

In the accompanying drawings,

FIG. 1 is a side elevation of a troll line depressor embodying the invention;

FIG. 2 is a view corresponding to FIG. 1, showing proportions of the device;

FIG. 3 is a front elevation of the device shown in FIG. 1;

FIG. 4 is a bottom plan view of the device shown in FIG. 1;

FIGS. 5 and 6 show side and top views, respectively, of the plate portion of FIG. 1. The broken lines in FIG. 6 show the plate blank prior to bending;

FIG. 7 shows a blank, prior to bending, for producing the plate shown in FIGS. 5 and 6;

FIGS. 8 and 9 show tilted positions of the depressor.

DESCRIPTION OF THE PREFERRED EMBODIMENT

FIG. 1 illustrates a troll line depressor embodying the invention. The depressor includes a plate 10 comprising a pair of triangular symmetrical wings 12, 14 (FIG. 3) joined at a spine 16. The plate is preferably made of a non-corrodable metal or of molded plastic. A rigid wire bridle 18 comprising two straight segments 19,19', extends between the ends of the spind, being welded or otherwise affixed thereto at points 20 and 22. A fish lure line 23 is attached to the bridle at its upper end 20. The apex 24 of the bridle lies a perpendicular distance L (FIG. 2) from the plate, which distance is preferably about one-third of the length M of the spine. A towing line 26 is attached to the bridle by means of a ring 28, which can slide along the bridle, but is normally positioned at its apex.

A rod 29 is affixed to the rear surface of the plate, as by welding. The rod includes a short segment 30 attached to the spine 16, and a long segment 32 that is substantially vertical in use. A stabilizing weight 36 is mounted on the long rod segment, either permanently as shown, or by means of a thumbscrew, (as illustrated in the Blevins patent, supra) for height adjustability.

FIGS. 6 and 7 show the geometry of the plate 10, whose proportions are chiefly responsible for the exceptional stability of this device. The plate is bent so that the wings 12, 14 have a rearward slant, with a dihedral angle (FIG. 6) of approximately 100° between them. As shown in FIG. 7, each wing forms a right triangle whose hypotenuse lies along the spine 16. The lower (leftmost, in FIG. 7) apex 40 of each projected wing has a greater included angle X than does the angle Y included by the upper apex 42. Angles of 60° and 30° are presently preferred for X and Y respectively. As shown in FIGS. 1 and 2, the bridle and spine define another triangle similar in shape to the wings, and similarly oriented, i.e., so that the smallest included angle of all three triangles lie adjacent at a common end of the spine.

In operation, the troll line depressor is towed through water by means of line 26, and the plate assumes the orientation shown in FIG. 1. Water flowing horizontally over and around the device produces a downward force sufficient to maintain the tow line at 25°-30° from horizontal. Since both the depression force and the drag force increase with speed, the depression angle remains constant over a range of speeds. Furthermore, the 100° dihedral angle provides good lateral stability to prevent fluttering and side-to-side movement of the depressor, while the weight 34 helps prevent yaw of the depressor with respect to its towing line.

The depressor is stable in its FIG. 1 orientation, since both legs of the bridle are maintained in tension during normal towing by the hydrodynamic forces distributed over the surface of the plate. However, when a fish strikes the line 23, the force on the line causes the device to tilt or tip rearward, as shown in FIG. 8. Since the towing line is connected to the bridle by a sliding ring, the plate can tip to a stable, horizontal position as the ring 28 slides to the lower end of the bridle. In the horizontal position, the depressor does not perform its function of developing substantial hydrodynamic force, and thus does not add drag to the pull of the fish, or give false signals as to the direction of pull.

On the other hand, if an obstacle on the river bottom catches the weight 36, the depressor can tilt in the opposite direction, as shown in FIG. 9, to release the obstacle.

Thus, the present invention not only provides for smooth, stable trolling, but also provides advantages over the prior invention by Blevins, by its ability to tilt fore and aft to the horizontal.

It should be realized that the foregoing is but one embodiment of the invention, whose full scope is to be measured by the following claims. Minor variations and changes will occur to one of skill in the art, as will other uses.

We claim:

1. In a troll line depressor comprising a plate defining two triangular wings interconnected along a spine, the wings being symmetrical about a plane of symmetry containing the spine, the wings being swept backward with a dihedral angle of at least 100° therebetween, so as to provide lateral stability when the depressor is towed through water, and a weight affixed to the plate, with its center of gravity below the lowermost portion of the plate, the improvement comprising, in combination therewith, a rigid bridle affixed to said spine and extending within said plane of symmetry forward from the spine, said bridle comprising a single piece of rigid wire bent to define two straight segments joined at an apex, said apex lying at a perpendicular distance from the spin approximately one-third the length of the spine, and said legs being affixed to respective opposite ends of said spine, and a towing ring mounted on said bridle and normally positioned at said apex so that when the depressor is towed through water by a towing line attached to said ring, hydrodynamic drag is developed on the towing line, said ring further being slidable along said bridle to either end of said spine, to allow the depressor to tilt to an inactive position, thereby relieving the hydrodynamic drag, when external forces are applied at either end of the depressor.

2. The invention of claim 1, wherein each of said wings defines a triangle having three different included angles, and said bridle and said spine also defining a triangle having three different included angles, all three of the triangles thus defined being arranged so that the smallest included angle of all three triangles lie adjacent at a common end of the spine.

3. The invention of claim 1, wherein each of said wings has substantially the shape of a right triangle, the hypotenuse of each lying along said spine.

4. The invention of claim 3, wherein each triangular wing has an upper apex at the upper end of said spine and a lower apex at the lower end of said spine, the angle included by said lower apex being greater than the angle included by said upper apex.

5. The invention of claim 4, wherein the angle included by each of said upper apices is about 60°.

6. The invention of claim 4 wherein said bridle apex is substantially closer to said lower apex than to said upper apex.

* * * * *